(12) United States Patent
Sakakibara et al.

(10) Patent No.: US 7,214,408 B2
(45) Date of Patent: May 8, 2007

(54) METHOD OF PRODUCING CARBON FIBER AGGREGATE

(75) Inventors: Teigo Sakakibara, Kanagawa (JP); Yoichi Hirose, Kanagawa (JP)

(73) Assignees: Canon Kabushiki Kaisha, Tokyo (JP); Tokai University Educational System, Tokyo (JP)

(*) Notice: Subject to any disclaimer, the term of this patent is extended or adjusted under 35 U.S.C. 154(b) by 10 days.

(21) Appl. No.: 10/925,945

(22) Filed: Aug. 26, 2004

(65) Prior Publication Data
US 2005/0232843 A1 Oct. 20, 2005

(30) Foreign Application Priority Data
Aug. 28, 2003 (JP) ............... 2003-304824

(51) Int. Cl.
*B05D 5/00* (2006.01)
(52) U.S. Cl. ............... 427/249.1; 427/255.14; 427/255.25; 427/255.28
(58) Field of Classification Search ........ 427/249.1, 427/255.14, 255.25, 255.28
See application file for complete search history.

(56) References Cited

U.S. PATENT DOCUMENTS

| | | | |
|---|---|---|---|
| 5,747,161 A | 5/1998 | Iijima | 428/367 |
| 5,830,326 A | 11/1998 | Iijima | 204/173 |
| 5,933,791 A | 8/1999 | Hamada et al. | 702/30 |
| 6,455,021 B1 | 9/2002 | Saito | 423/447.3 |
| 6,495,258 B1* | 12/2002 | Chen et al. | 428/408 |
| 6,565,971 B2* | 5/2003 | Morita et al. | 428/367 |
| 6,790,426 B1 | 9/2004 | Ohsaki | 423/447.2 |
| 6,849,245 B2* | 2/2005 | Baker et al. | 423/447.3 |
| 2003/0147801 A1* | 8/2003 | Someya et al. | 423/447.3 |
| 2004/0151653 A1 | 8/2004 | Ando et al. | 423/447.1 |

FOREIGN PATENT DOCUMENTS

| | | |
|---|---|---|
| JP | 5-9812 | 1/1993 |
| JP | 5-125619 | 5/1993 |
| JP | 5-179514 | 7/1993 |
| JP | 5-229809 | 9/1993 |
| JP | 6-157016 | 6/1994 |
| JP | 6-212517 | 8/1994 |
| JP | 8-13254 | 1/1996 |
| JP | 8-134724 | 5/1996 |
| JP | 9-241929 | 9/1997 |
| JP | 2000-95509 | 4/2000 |

(Continued)

OTHER PUBLICATIONS

Gogotsi Y. et al., Hydrothermal synthesis of multiwall carbon nanotubes, Dec. 2000, J. Mater. Res, vol. 15 No. 12, 2591-2594.*

(Continued)

*Primary Examiner*—Fred J. Parker
(74) *Attorney, Agent, or Firm*—Fitzpatrick, Cella, Harper & Scinto

(57) ABSTRACT

A method of producing an aggregate of hollow or solid carbon fibers is provided, which comprises the step of (i) heating a solution comprising carbon, oxygen, hydrogen, and sulfur as components; or (ii) heating a vapor of a solution comprising carbon, oxygen, hydrogen, and sulfur as components in an atmosphere of a saturated vapor of the solution.

28 Claims, 5 Drawing Sheets

FOREIGN PATENT DOCUMENTS

| | | |
|---|---|---|
| JP | 2001-19413 | 1/2001 |
| JP | 2001-80913 | 3/2001 |
| JP | 2003-12312 | 1/2003 |

OTHER PUBLICATIONS

Motojima S. et al., Preparation of coiled carbon fibers by pyrolysis of acetylene using Ni catalyst and sulfur or phosphorus compound imurity, May 1993, Appl. Phys. Lett., 62 (19), 2322-2323.*

* cited by examiner

METHOD OF PRODUCING CARBON FIBER AGGREGATE

BACKGROUND OF THE INVENTION

1. Field of the Invention

The present invention relates to a method of producing a hollow or solid carbon fiber with an active surface in a solution or in an atmosphere of a saturated vapor of a solution.

2. Related Background Art

A number of hollow or solid fibers, such as a carbon nanotube (CNT), a carbon nanofiber (CNF) or a carbon fiber (CF), are known. In order to produce these fibers, it is necessary to expose a depressurized gas to a high temperature of 500° C. or more (for instance, see Japanese Patent Application Laid-Open Nos. H5-125619; H5-229809; H6-157016; H8-13254; H8-134724; H9-241929; 2000-95509; 2001-19413; and 2001-80913). Further, a high temperature of 900° C. or more may be necessary for producing the fibers (for instance, see Japanese Patent Application Laid-Open No. 2003-12312). Such materials have been considered to be capable of greatly improving their mechanical characteristics, electrical characteristics and the like by being combined with plastic, ceramic, rubber, metal material, or the like. Various researches have been conducted to explore this issue.

Carbon nanotubes, carbon nanofibers, carbon fibers or the like, which can be produced by these methods, have very few active sites on the fiber surfaces, resulting in gaps between the fibers and plastic, ceramic, rubber, metal, or the like. Thus, the combinations have not been able to fully achieve the original purpose. In order to overcome these deficiencies, several methods, such as an oxidization treatment and a mechanical treatment, have been proposed as surface-activating methods (for instance, see Japanese Patent Application Laid-Open Nos. H5-9812; H5-179514; and H6-212517).

However, because these methods involve a heat treatment at a high temperature of 500° C. or more, they have difficulties in stably producing surface-activated carbon nanotubes, carbon nanofibers or carbon fibers.

SUMMARY OF THE INVENTION

It is, therefore, an object of the present invention to provide a method of producing a carbon fiber aggregate that has many active sites without forming a gap between itself and plastic, ceramic, rubber, metal, or the like.

A first aspect of the present invention is a method of producing an aggregate of hollow or solid carbon fibers, comprising the step of;

(i) heating a solution comprising carbon, oxygen, hydrogen, and sulfur as components; or (ii) heating a vapor of a solution comprising carbon, oxygen, hydrogen, and sulfur as components in an atmosphere of a saturated vapor of the solution.

A second aspect of the present invention is a method of producing an aggregate of hollow or solid carbon fibers, which comprises the step of heating a vapor of a solution comprising carbon, oxygen and hydrogen as components in an atmosphere of a saturated vapor of the solution, wherein the saturated vapor of the solution is heated with a filament disposed in the atmosphere of the saturated vapor of the solution to form an aggregate of carbon fibers on a substrate comprising a sulfur compound disposed in the atmosphere of the saturated vapor.

A third aspect of the present invention is an aggregate of carbon fibers formed of a stack or bundle of a plurality of carbon fibers produced by above-mentioned method.

The present invention has made it possible to produce an aggregate of carbon fibers, which has a number of active sites and does result in gaps between the aggregate and plastic, ceramic, rubber, metal, or the like.

DESCRIPTION OF THE PREFERRED EMBODIMENTS

The present invention will be now described in detail with reference to the drawings.

The method of producing a hollow or solid carbon fiber according to the present invention and an apparatus used for carrying out the method will be now described with reference to FIG. 1.

Figure 1:
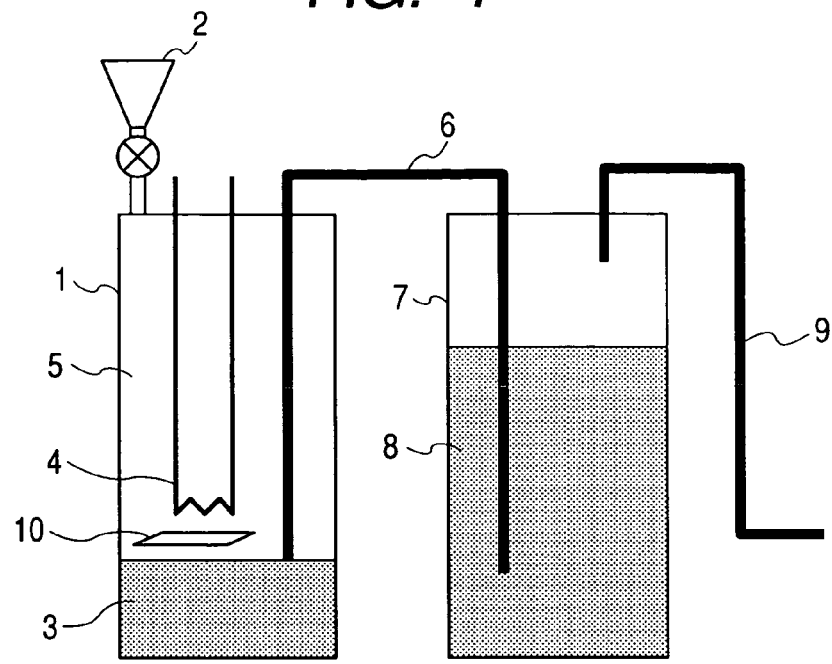
FIG. 1 is a schematic sectional view showing an apparatus used for carrying out the present invention.

FIG. 1 is a schematic sectional view illustrating an apparatus used for carrying out the present invention. After a glass reaction vessel 1 has been filled with a solution 3 containing at least carbon, oxygen, hydrogen, and sulfur as components through a funnel 2, so as to keep no space, a stop cock of the funnel 2 is closed. Examples of the solution containing carbon, oxygen, hydrogen, and sulfur as components include a mixture of an organic solvent, such as an alcohol, ether, ketone, ester, aldehyde, carboxylic acid compound, or the like, with a sulfur compound, such as a thiol, thioether, thiocarbonyl, carbon sulfide, hydrogen sulfide, sulfuric acid compound, aromatic thio compound, or the like; or a solution of a sulfur-containing carbohydrate. Examples of the organic solvent include, but are not limited to, methanol, ethanol, propanol, butanol, dimethylether, methylethylether, formaldehyde, acetaldehyde, formic acid, acetic acid, and ethyl acetate. Examples of the sulfur compound include, but are not limited to, methanethiol, thiourea, carbon disulfide, sodium thiosulfate, thiophene, thiazole, and methionine.

The carbon to oxygen elemental ratio of the solution is preferably within the range from 1:2 to 6:1, more preferably within the range from 1:2 to 4:1. When the ratio of carbon is more than 6:1, a desired hollow carbon fiber is hardly obtained and much soot is produced. Examples of a solution containing carbon, oxygen and hydrogen as components include, but are not limited to, methanol, ethanol, propanol, butanol, dimethylether, methylethylether, formaldehyde, acetaldehyde, acetone, formic acid, acetic acid, and ethyl acetate.

The carbon to sulfur elemental ratio of the solution is preferably within the range from 100:1 to 1,000,000:1, more preferably within the range of 300:1 to 100,000:1. When the ratio of sulfur is less than 100:1, the carbon fiber will not grow. On the contrary, when the ratio is greater than 1,000,000:1, carbon fibers having separate shapes tend to grow.

The glass reaction vessel 1 is connected to another glass reaction vessel 7 through a metallic tube 6. To the glass reaction vessel 7, another metallic tube 9 is connected as shown in the figure. In the glass reaction vessel 1, a substrate 10 made of a metal, such as Ni, is placed at a lower part of the glass reaction vessel 1. At a part about 5 mm above the substrate 10, a filament 4 made of W is disposed. In such a state, voltage is applied to the W filament 4. As the W filament 4 is heated, the solution 3 filling the glass reaction vessel 1 flows into the glass reaction vessel 7 through the metallic tube 6 until the liquid level in the reaction vessel 1 reaches the lower end face of the metallic tube 6, and the solution 8 is accumulated in the glass reaction vessel 7. The space 5 left thereafter is filled with a saturated vapor of the solution. The amount of the remaining solution at this time is preferably about 20% of the volume of the glass reaction vessel 1. When the W filament 4 is heated to a temperature of 1,500 to 2,300° C., the substrate 10 is heated to a temperature of 300 to 700° C., so that carbon fibers deposit on the substrate 10. The vapor of the solution as a carbon source is heated and decomposed by the heat of the W filament to form carbon-based excited species (e.g., C, $C_2$, CH, and $CH_2$) and a carbon-based gas (e.g., $CH_4$, $C_2H_2$ and CO), which deposit as carbon fibers on the metal substrate disposed 5 mm below the W filament. It was confirmed that in the above process, sulfur atoms promote the formation of the carbon fibers by an unknown mechanism. As the reaction proceeds, the solution 3 as a source material is consumed, but the solution is resupplied using the solution 8 in the glass reaction vessel 7 to keep the liquid level always constant.

The carbon fibers produced using such a method have an amorphous structure, because the growth temperature is as low as 300 to 700° C. In addition, because the carbon fibers are produced in the saturated vapor of the solution, the surface of the carbon fibers absorb substances originating from the solution. This provides the advantage that the carbon fibers are not oxidized and are kept in a stable state and the surface activity thereof is maintained to improve the compatibility with a resin material. As the material of the substrate, platinum (Pt), rhodium (Rh), ruthenium (Ru), nickel (Ni), iron (FeY, titanium (Ti), palladium (Pd), copper (Cu), aluminum (Al), tungsten (W), silicon (Si), molybdenum (Mo), cobalt (Co), yttrium (Y), or an alloy of at least two of these metals may be used with Ni being the most preferable.

In addition, as a result of investigations it was found that when a sulfur compound was incorporated into the metal substrate by, for example, heating in a sulfur vapor or surface treatment with a sulfur compound, and that the same effect could be obtained even if the solution contained no sulfur compound. In this case, as the solution, there may be used those solutions that contain at least one selected from the group consisting of an alcohol, ether, ketone, ester, aldehyde, and carboxylic acid compound. Further, as the sulfur compound, the compounds mentioned above may be used.

Observation of the obtained deposits with an FE type SEM (electric-field electron emission type scanning electron microscope) showed carbon fibers of a twisted thread shape and a rope shape. The typical diameter of the fiber was from about 10 nm to a sub-micrometer. Observing the fiber with a TEM (transmission electron microscope) revealed that the fiber was a carbon nanotube (hollow nano-size carbon fiber) having a diameter of 75 nm and an inside diameter of 20 nm. Further, some slightly thick carbon tubes had a diameter of 450 nm and an inside diameter of 250 nm. There were aggregates having plural carbon fibers bundled. Moreover, it was also revealed as a result of the TEM observation and Raman spectroscopic analysis (broad peak of amorphous carbon at 1350 $cm^{-1}$) that the obtained carbon fibers had amorphous structures. The structure was significantly different from the previously reported structure of crystalline carbon fibers. Thus, because at least the surface layers of the carbon fibers obtained in accordance with the present invention have amorphous structures and active sites, the carbon fibers have a good affinity with a resin or the like and have excellent in dispersibility. In addition, when the aggregates formed of bundles of carbon fibers are dispersed in a resin or the like, there are exhibited advantageous effects, such as an improvement in conductivity and in strength of the resin or the like only by addition of a small amount of the aggregates.

In order to deposit carbon, a complex compound having, as a central metal, a metal of Group 8 of the periodic table, such as nickel, palladium, platinum, iron, cobalt, and ruthenium or a metal of Group 6A of the periodic table, such as tungsten and molybdenum, may be used. The metal complex compounds, when applied to the substrate, or dispersed or dissolved in the solution, improve the growth efficiency of the hollow carbon fibers.

The solution used in the present invention may further contain water. When 1 to 50 vol % of water was added to the solution, the above-mentioned effect was recognized to be exhibited, but an addition of 20 vol % or less water was found to be most effective. In addition, the above-mentioned metal complex compound of Group 8 of the periodic table, such as nickel, palladium, platinum, iron, cobalt, and ruthenium or metal complex compound of Group 6A of the periodic table, such as tungsten and molybdenum, may be dispersed or dissolved in the solution that is used as the source material. The concentration of the metal complex is generally 0.0005 to 1.0 g per 100 ml of the solution, and preferably 0.001 to 0.5 g.

Examples of the metal complex compound include, but are not limited to, complexes of metals of Group 8, such as platinum acetylacetonate, nickel acetylacetonate, palladium acetylacetonate, cobalt acetylacetonate, and iron acetylacetonate.

Figure 2:
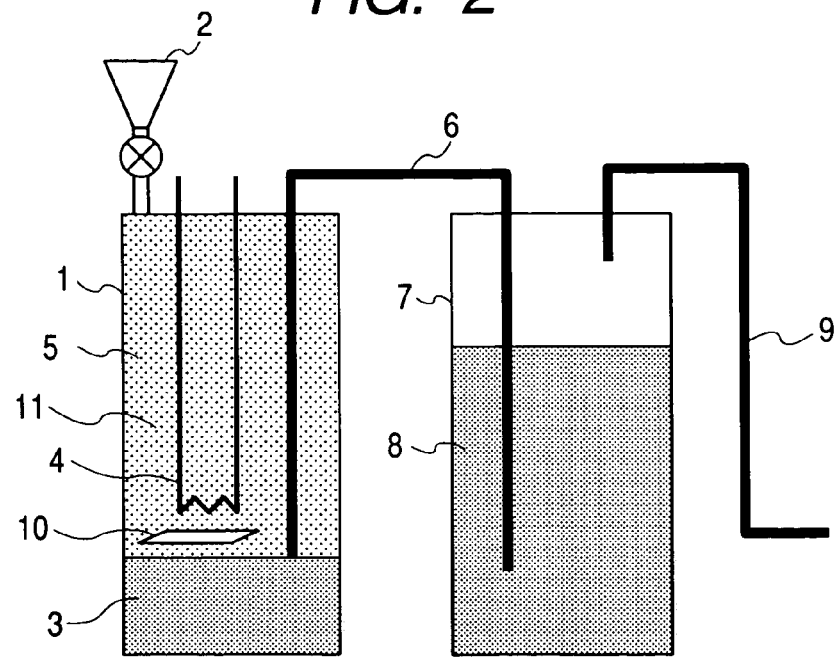
FIG. 2 is a schematic sectional view showing another apparatus used for carrying out the present invention.

FIG. 2 is a schematic sectional view illustrating another apparatus used for carrying out the method of the present invention. With the apparatus shown in FIG. 2, when fine metal particles 11 (e.g., fine Ni particles (diameter: 1 to 3 μm)) are put on a substrate 10 and a W filament 4 is heated to a temperature of 1,500 to 2,300° C., the fine Ni particles float across a reaction space 5. On the other hand, the source material 3 (e.g., methanol having 0.01 vol % of carbon disulfide added thereto) is vaporized by the heat of the W filament and further decomposed into carbon-based gas or radicals, which adhere to the fine Ni particles floating in the reaction space, to be solid-dissolved and deposited as solid carbon on a substrate 10. Specifically, the formation of carbon can be recognized by the phenomenon of a black fibrous substance floating across the reaction space. Observation with an FE type SEM of the black substance that fell and deposited on the substrate proved that bundles of carbon nanofibers (CNFs) and carbon fibers (CFs) were generated. Incidentally, the used fine Ni particles act as nuclei for formation of CNFs and CFs. The synthesis time is about 10 minutes.

Figure 3:
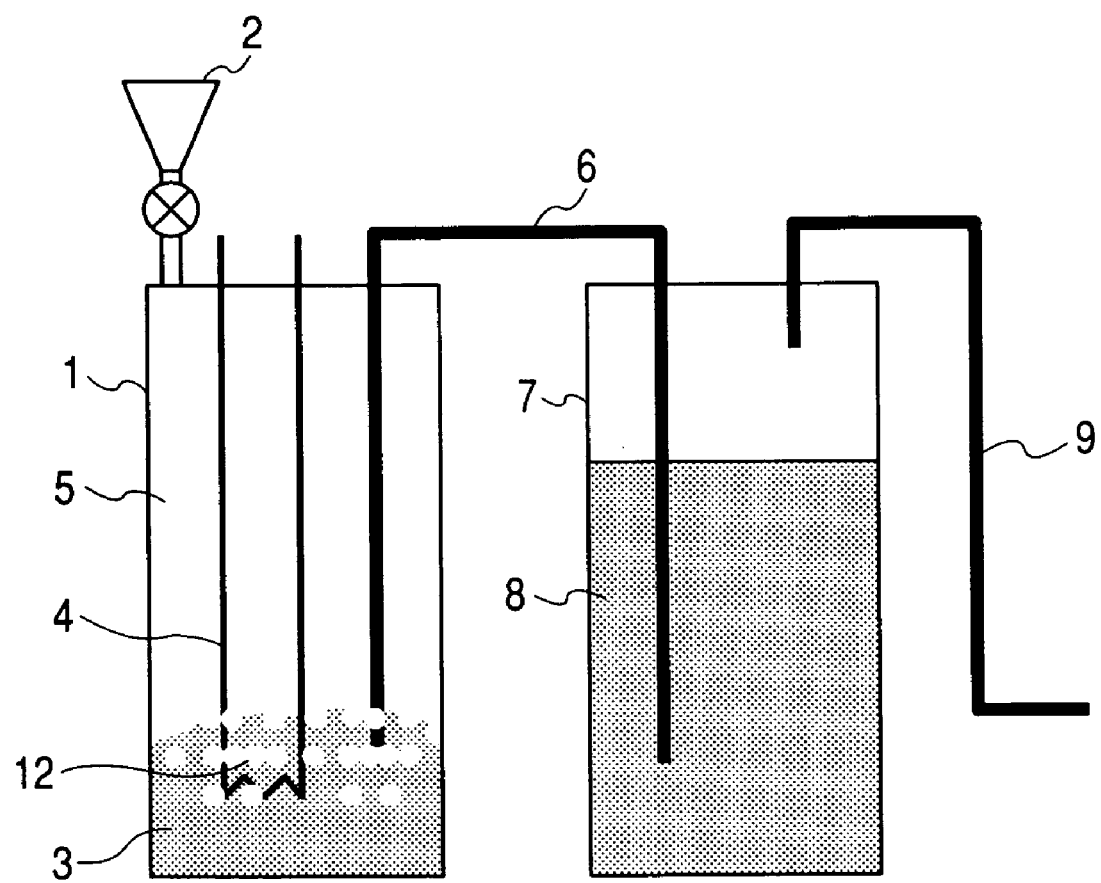
FIG. 3 is a schematic sectional view showing still another apparatus used for carrying out the present invention.

FIG. 3 is a schematic sectional view illustrating another apparatus used for carrying out the present invention. With the apparatus shown in FIG. 3, when a metal chelate powder (e.g., nickel acetylacetonate) is dissolved in the source material 3 (e.g., methanol having 0.01 vol % of carbon disulfide added thereto) and the W filament 4 is heated to a temperature of 1,500 to 2,300° C., the source material comes to a boil, thereby generating bubbles 12. When the synthesis is continued for about 10 minutes, the solution of the source material becomes black. This is because solid carbon grows inside the bubbles. The black substance in the solution was extracted, dried and observed with an FE type SEM, confirming the formation of bundles of CNFs and CFs.

As described above, the present invention provides a unique method, which is advantageous in that hollow carbon fibers can be produced at atmospheric pressure without using a carrier gas.

EXAMPLES

The present invention will be now specifically explained with reference to examples below.

Example 1

Figure 4:
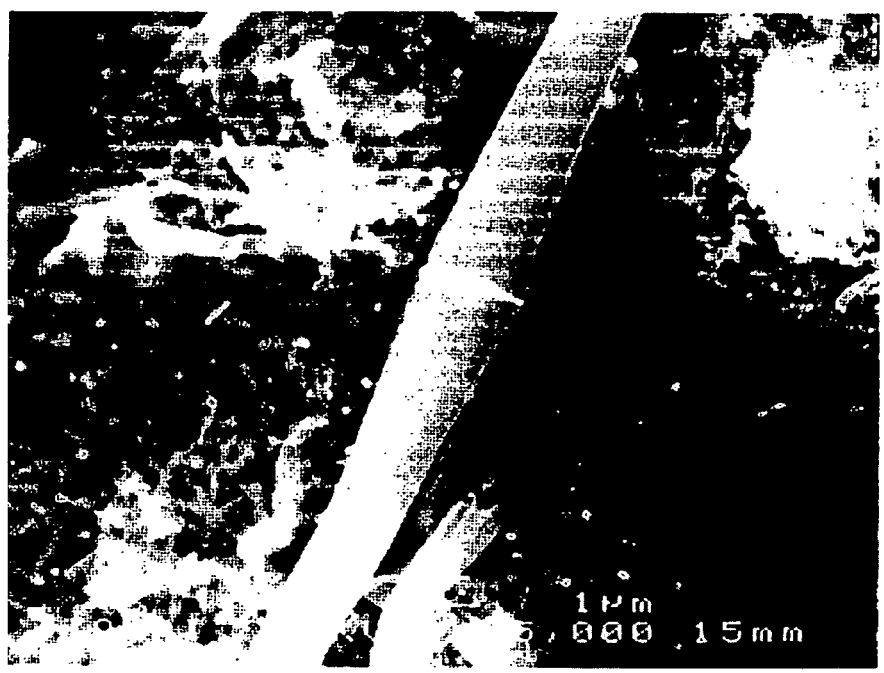
FIG. 4 is an FE-type SEM photograph of carbon fiber and bundle of carbon nanofibers all synthesized in Example 1.
Figure 5:
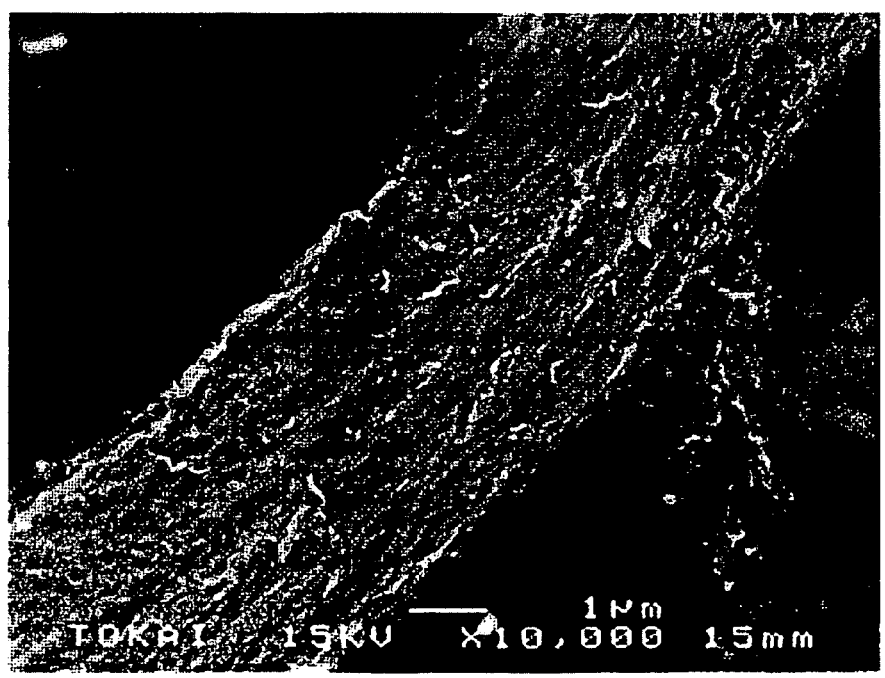
FIG. 5 is FE-type SEM photograph of carbon fiber and bundle of carbon nanofibers all synthesized in Example 1.
Figure 6:
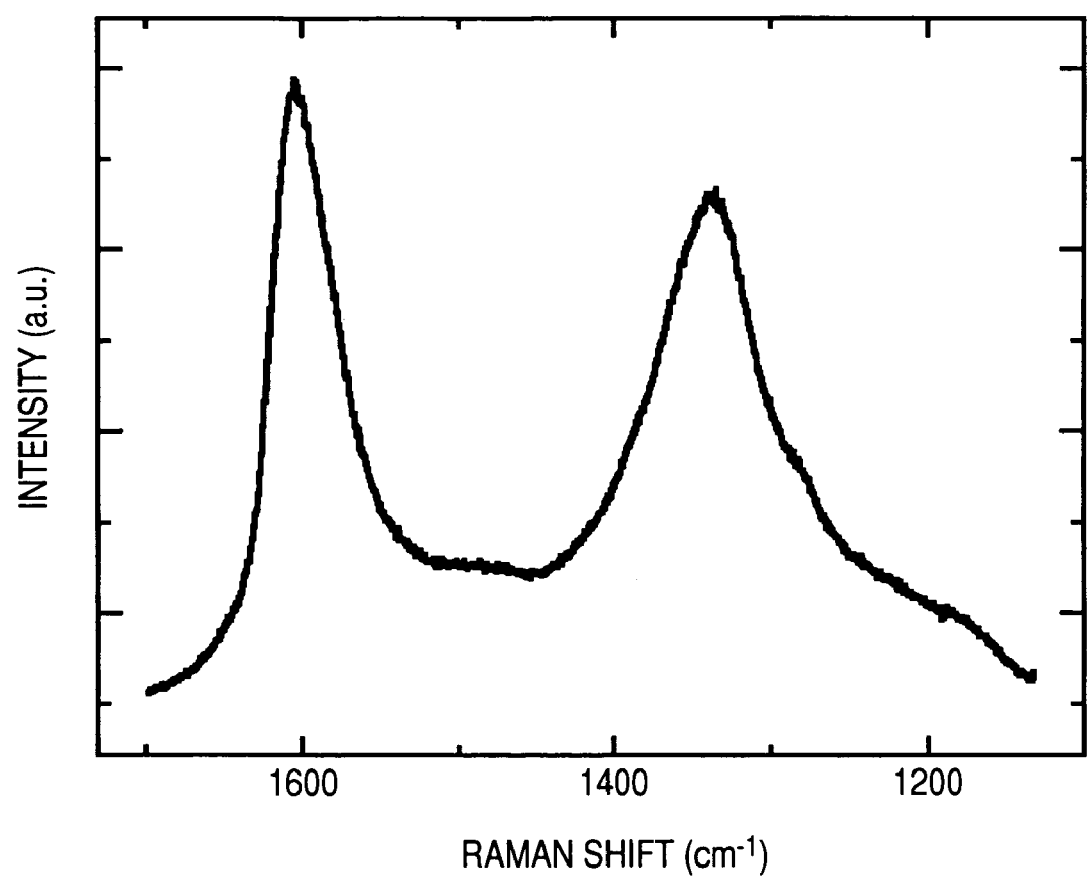
FIG. 6 is a Raman spectrum of carbon fiber and bundle of carbon nanofibers all synthesized in Example 1.
Figure 7:
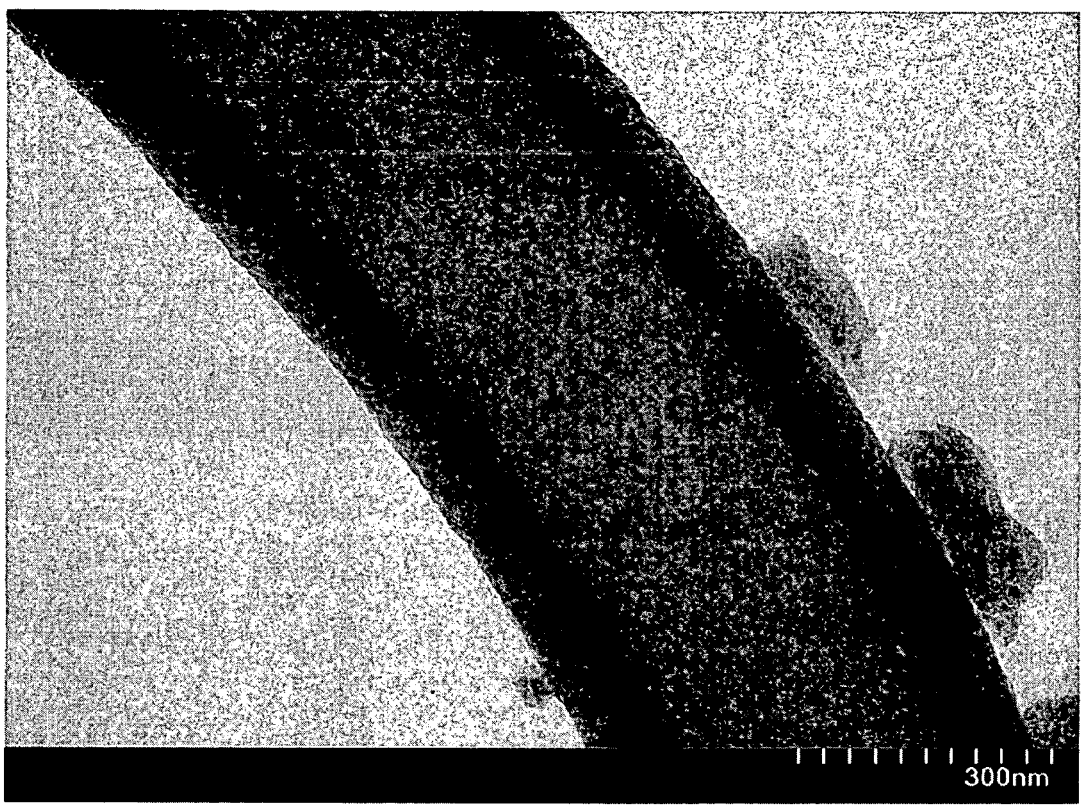
FIG. 7 is a TEM photograph of carbon fiber and bundle of carbon nanofibers all synthesized in Example 1.

As a carbon source, a solution of methanol ($CH_3OH$) having 0.01 vol % of carbon disulfide ($CS_2$) added thereto was employed, and the CVD apparatus shown in FIG. 1 was used. When a W filament 4 (0.2 mmφ) was heated to 2,000° C., a Ni plate (7×7×0.5 mm) was employed as the substrate 10, and the distance therebetween was set to 3 mm, the temperature of the substrate reached about 600° C. caused by the radiation from the filament 4. The synthesis time was 10 minutes. After 10 minutes, it was confirmed that black substance deposited on the Ni plate. When the deposit (or stack) was observed with an FE type SEM, it was confirmed that single carbon fibers (CFs) with the diameters of 0.3 to 4 μm were grown. An SEM photograph of a synthesized thick CF is shown in FIG. 4. Further, there were observed a number of bundles of CNFs having superfine CNFs (carbon nanofibers with diameters of several ten nm to several hundred nm) bundled together. The bundles had diameters of about 4 μm. An SEM photograph of a typical bundle of CF is shown in FIG. 5. It is observed that the surface is covered with CNF. It was seen from a broad peak of amorphous carbon (1350 $cm^{-1}$) observed in Raman spectroscopic analysis that the obtained carbon fibers had amorphous structures (FIG. 6). Moreover, it was confirmed as a result of TEM observation (FIG. 7) that both surface and central portions of the carbon fibers had amorphous structures.

Example 2

Carbon fibers were grown following the same procedure as in Example 1 with the exception that a Fe plate (7×7×0.5 mm) was employed as the substrate instead of the Ni plate used in Example 1. The results showed that thick carbon fibers with large diameters also deposited on the Fe plate. However, the formed amount was less than that on the Ni plate.

Example 3

Carbon fibers were grown following the same procedure as in Example 1 with the exception that the W filament was heated to 1,700° C., with the result that hollow amorphous carbon fibers were obtained, though the amount of the obtained carbon fibers is somewhat smaller.

Example 4

Carbon fibers were grown following the same procedure as in Example 1 with the exception that methanol having 0.1 vol % of thiourea added thereto was used as a carbon source instead of the carbon disulfide-added methanol, with the result that thick CFs and bundles of CNFs were confirmed to grow with an FE type SEM.

Example 5

Carbon fibers were grown following the same procedure as in Example 1 with the exception that methanol having 0.01 vol % of sodium thiosulfate added thereto was used as a carbon source instead of the carbon disulfide-added methanol, with the result that thick CFs and bundles of CNFs were observed to grow with an FE type SEM.

Example 6

Carbon fibers were grown following the same procedure as in Example 1 with the exception that methanol having 0.01 vol % of methionine added thereto was used as a carbon source instead of the carbon disulfide-added methanol, with the result that thick CFs and bundles of CNFs were observed to grow with an FE type SEM.

Example 7

Woolly Fe (melting point: 1,535° C.; diameter: 0.02 mm) was sulfurized to prepare FeS (melting point: 1,193° C.) and $FeS_2$ (melting point: 642° C.). The shape of the product was kept woolly. The iron sulfide was wound around a W filament, and the filament was heated to 2,000° C. in an atmosphere of 100% methanol, with the result that black sooty substance was found to float across a reaction space. Bundles of CNFs were observed to grow with an FE type SEM.

Example 8

Woolly Ni (melting point: 1,453° C.; diameter: 0.05 mm) was heated and sulfurized in a sulfur vapor. As a result of X-ray diffraction analysis for examining the crystal structure, the product was confirmed to be NiS (melting point: 810° C.). In an atmosphere of 100% methanol, a W filament was disposed, and below the W filament, the woolly NiS was disposed as a substrate. The distance between the filament and the substrate was set to 2 to 3 mm. When the W filament was heated to 2,000° C., the substrate was heated to a temperature of about 500 to 600° C. by the radiant heat from the filament. Furthermore, a phenomenon was observed in which black fibrous substance floated across a reaction space. The fibrous substance was sampled with a collection plate disposed at a separate place and observed with an FE type SEM to determine that the substance was CFs (carbon fibers) with diameters of 0.1 to 0.5 μm.

Comparative Example 1

A synthesis experiment was performed following the same procedure as in Example 1 with the exception that a solution of methanol having 5 vol % of carbon disulfide ($CS_2$) added thereto was used as a carbon source, with the result that a black sooty substance deposited, but no fibrous substance was observed with an FE type SEM.

Comparative Example 2

A synthesis experiment was performed following the same procedure as in Example 7 with the exception that benzene was used instead of methanol, with the result that a black sooty substance floated across the reaction space, but no fibrous substance was observed with an FE type SEM.

This application claims priority from Japanese Patent Application No. 2003-304824 filed Aug. 28, 2003, which is hereby incorporated herein by reference.

What is claimed is:

1. A method of producing an aggregate of hollow or solid carbon fibers in a container holding a solution comprising carbon, oxygen, hydrogen, and sulfur as components, the method comprising the step of:
   (i) heating the solution in the container in an atmosphere of a saturated vapor of the solution for producing the aggregate of hollow or solid carbon fibers; or
   (ii) heating a vapor of the solution in the container in an atmosphere of a saturated vapor of the solution for producing the aggregate of hollow or solid carbon fibers,
   wherein the elemental ratio of carbon to oxygen in the solution is within the range from 1:2 to 6:1, and the elemental ratio of carbon to sulfur in the solution is within the range from 300:1 to 100,000:1.

2. The method according to claim 1, wherein the solution comprises at least one organic solvent selected from the group consisting of alcohol, ether, ketone, ester, aldehyde, carboxylic acid compound, and at least one sulfur compound selected from the group consisting of thiol, thioether, thiocarbonyl, carbon sulfide, hydrogen sulfide, sulfuric acid compound, and aromatic thio compound.

3. The method according to claim 1, wherein the solution comprises at least one organic solvent selected from the group consisting of methanol, ethanol, propanol, butanol, dimethylether, methylethylether, formaldehyde, acetaldehyde, formic acid, acetic acid, and ethyl acetate.

4. The method according to claim 1, wherein the solution comprises at least one sulfur compound selected from the group consisting of methanethiol, thiourea, carbon disulfide, sodium thiosulfate, thiophene, thiazole, and methionine.

5. The method according to claim 1, wherein the solution used in step (i) or the solution used in step (ii) further comprises water.

6. The method according to claim 1, wherein the solution used in step (i) or the solution used in step (ii) further comprises a metal complex compound.

7. The method according to claim 6, wherein the metal complex compound has, as a central metal, a metal selected from the group consisting of platinum, palladium, nickel, iron, cobalt, ruthenium, tungsten, and molybdenum.

8. The method according to claim 1, wherein the heating of the solution in step (i) is performed using a filament immersed in the solution.

9. The method according to claim 1, wherein the heating of the vapor of the solution in step (ii) is performed using a filament disposed in the atmosphere of the saturated vapor of the solution.

10. The method according to claim 8, wherein the filament is heated to a temperature of 1,500 to 2,300° C.

11. The method according to claim 9, wherein the filament is heated to a temperature of 1,500 to 2,300° C.

12. The method according to claim 1, wherein step (ii) comprises the step of forming the aggregate of carbon fibers on a substrate disposed in the atmosphere of the saturated vapor.

13. The method according to claim 12, wherein the substrate comprises at least one element selected from the group consisting of nickel, platinum, ruthenium, rhodium, iron, titanium, palladium, copper, aluminum, tungsten, silicon, molybdenum, yttrium, and cobalt.

14. The method according to claim 13, wherein the substrate further comprises sulfur.

15. A method of producing an aggregate of hollow or solid carbon fibers in a container holding a solution comprising carbon, oxygen and hydrogen as components, the method comprising the step of heating a vapor of the solution in the container in an atmosphere of a saturated vapor of the solution for producing the aggregate of hollow or solid carbon fibers,
   wherein the saturated vapor of the solution is heated with a filament disposed in the atmosphere of the saturated vapor of the solution to form an aggregate of carbon fibers on a substrate comprising a sulfur compound disposed in the atmosphere of the saturated vapor.

16. The method according to claim 15, wherein the elemental ratio of carbon to oxygen in the solution is within the range from 1:2 to 6:1.

17. The method according to claim 15, wherein the solution includes at least one selected from the group consisting of alcohol, ether, ketone, ester, aldehyde, and carboxylic acid compound.

18. The method according to claim 15, wherein the solution includes at least one selected from the group consisting of methanol, ethanol, propanol, butanol, dimethylether, methylethylether, formaldehyde, acetaldehyde, formic acid, acetic acid, and ethyl acetate.

19. The method according to claim 15, wherein the solution further comprises water.

20. The method according to claim 15, wherein the solution further comprises a metal complex compound.

21. The method according to claim 20, wherein the metal complex compound has, as a central metal, a metal selected from the group consisting of platinum, palladium, nickel, iron, cobalt, ruthenium, tungsten, and molybdenum.

22. The method according to claim 15, wherein the filament is heated to a temperature of 1,500 to 2,300° C.

23. The method according to claim 15, wherein the substrate comprises at least one element selected from the group consisting of nickel, platinum, ruthenium, rhodium, iron, titanium, palladium, copper, aluminum, tungsten, silicon, molybdenum, yttrium, and cobalt.

24. The method according to claim 23, wherein the substrate comprises nickel.

25. The method according to claim 15, wherein the substrate comprises at least one selected from the group consisting of nickel, platinum, rhodium, ruthenium, iron, titanium, palladium, copper, aluminum, tungsten, silicon, molybdenum, cobalt, and yttrium and is heat-treated in a sulfur vapor.

26. The method according to claim 15, wherein the substrate comprises at least one selected from the group consisting of nickel, platinum, rhodium, ruthenium, iron, titanium, palladium, copper, aluminum, tungsten, silicon, molybdenum, cobalt, and yttrium and has a surface treated with a sulfur compound.

27. The method according to claim 26, wherein the sulfur compound comprises at least one selected from the group consisting of thiol, thioether, thiocarbonyl, carbon sulfide, hydrogen sulfide, sulfuric acid compound, and aromatic thio compound.

28. The method according to claim 27, wherein the sulfur compound comprises at least one selected from the group consisting of methanethiol, thiourea, carbon disulfide, sodium thiosulfate, thiophene, thiazole, and methionine.

* * * * *